United States Patent [19]

Radzishevsky et al.

[11] 4,262,166

[45] Apr. 14, 1981

[54] SEALED INLET FOR BUNCHED CONDUCTORS

[76] Inventors: Oleg L. Radzishevsky, ulitsa Gogolya, 20 "V", kv. 60; Veniamin F. Palamodov, ulitsa Batumskaya, 20, kv. 50, both of Sevastopol, U.S.S.R.

[21] Appl. No.: 78,244

[22] Filed: Sep. 24, 1979

[51] Int. Cl.$^3$ .................... H02G 3/18; F16L 39/00
[52] U.S. Cl. ................... 174/65 R; 174/151; 248/56; 285/137 R; 285/158; 285/192; 285/374; 403/192
[58] Field of Search .......... 285/137 R, 192, 158, 285/161, 207, 404, 374; 248/56; 403/192; 174/151, 65 R

[56] References Cited

U.S. PATENT DOCUMENTS

| | | | |
|---|---|---|---|
| 1,109,962 | 9/1914 | Chadwick | 248/56 |
| 2,517,717 | 8/1950 | Rose | 285/137 R |
| 3,454,291 | 7/1969 | Goldsobel et al. | 285/404 |
| 3,489,440 | 1/1970 | Brattberg | 403/192 |
| 3,582,096 | 6/1971 | Norton | 285/137 R |
| 4,056,252 | 11/1977 | Simon | 248/56 |

FOREIGN PATENT DOCUMENTS 501185  11/1954  Italy .................... 285/137 R

Primary Examiner—Dave W. Arola
Attorney, Agent, or Firm—Lackenbach, Lilling & Siegel

[57] ABSTRACT

A sealed inlet for bunched conductors comprises a resilient sleeve located inside a body having a flange on one of its ends, the sleeve following the shape of the body and having a flange on one of its ends tightly pressed against the body flange. Located inside the resilient sleeve are resilient sealing elements, each accommodating a conductor. Installed directly on one of the external walls of the resilient sleeve is a hold-down strap with a retainer extending through a hole in the body wall and urging the hold-down strap against the resilient sleeve.

3 Claims, 2 Drawing Figures

1

SEALED INLET FOR BUNCHED CONDUCTORS

FIELD OF THE INVENTION

The present invention relates to entrances for bunched conductors and, more particularly, to a sealed inlet for bunched conductors.

The invention can be used to advantage for laying cables through walls, floors or ceilings in rooms which should be hermetically sealed, for example in ship-building and in refrigerating plants.

BACKGROUND OF THE INVENTION

At present, in view of the growing power capacities in various branches of industry the demand is constantly increasing for simplifying the designs of sealed inlets for bunched conductors used in hermetically-sealed locations.

DESCRIPTION OF THE PRIOR ART

Known in the prior art is a sealed inlet for bunched conductors (cf USA Pat. No. 3,489,440) comprising resilient sealing elements housed inside a body with a flange on one of its ends, the diameter of the internal cylindrical surfaces of said elements corresponding to the diameter of the conductor passing through each of them. A seal assembly is located between the body and the resilient sealing elements. A hold-down strap with a retainer is provided, said strap being installed between one of the body walls and the seal assembly, and said retainer extending through a hole in the body wall. In this sealed inlet the seal assembly is constituted by a resilient insert which fills the gap between the body and the elastic sealing elements and consists of two parts, one installed at one side of the wall and the other being installed at the other side of the wall.

However, inasmuch as the gap between the body and the resilient sealing elements in this construction is variable, it becomes necessary in each particular case to select a resilient insert of the corresponding type and size, which increases the installation time.

Besides, installation of the resilient insert in this sealed inlet calls for simultaneous presence of operators on both sides of the wall being sealed, which also prolongs the installation time.

Thus, the design of the resilient insert in this inlet reduces the reliability of sealing in the presence of vibration in the room, e.g. on a ship.

BRIEF DESCRIPTION OF THE INVENTION

An object of the present invention lies in providing a sealed inlet for bunched conductors which would reduce the installation time.

Another object of the invention lies in promoting the reliability of sealing.

This is achieved by providing a sealed inlet for bunched conductors comprising resilient sealing elements housed inside a body with a flange on one of its ends, the diameter of the internal cylindrical surface of said elements corresponding to the diameter of the conductor passing through each of them. A seal assembly is located between the body and the resilient sealing elements, and a hold-down strap with a retainer is provided. The strap is installed between one of the walls of the body and the seal assembly, the retainer extending through a hole in the wall of the body. According to the invention, the seal assembly has the form of a resilient sleeve following the shape of the body and has a flange on one of its ends, said flange being pressed tightly against the flange of the body while the hold-down strap is installed directly on one of the external walls of the elastic sleeve whose other external walls are pressed against the internal surface of the body.

The present invention allows wide variations in the number of conductors passing through the sealed inlet.

BRIEF DESCRIPTION OF THE DRAWINGS

Other objects and advantages of the present invention will be apparent from the description of an example of its realization with reference to the accompanying drawings in which.

DETAILED DESCRIPTION OF THE INVENTION

Figure 1:
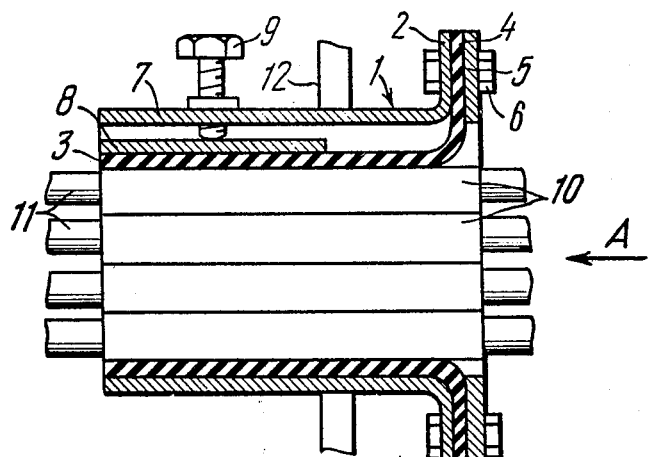
FIG. 1 is a sectional view of the sealed inlet for bunched conductors according to the invention.
Figure 2:
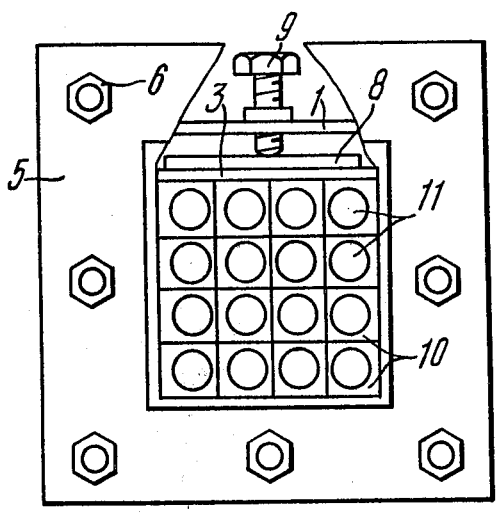
FIG. 2 is a side view taken in the direction of arrow A in FIG. 1, partially broken away.

A sealed inlet for bunched conductors comprises a resilient sleeve 3 housed inside a body 1 (FIG. 1) which has a flange 2 on one end. The sleeve 3 follows the shape of the body 1 and has a flange 4 on one of its ends. The flange 4 of the sleeve 3 is pressed tightly against the flange 2 of the body 1 by a frame 5 (FIGS. 1 and 2) and by bolts 6 passed through holes provided around the perimeter of the flanges 2 and 4 (FIG. 1) and on the frame 5. Located between one of the walls 7 of the body 1 and the sleeve 3 is a hold-down strap 8 with a retainer 9 (referred to hereinafter as bolt 9) extending through a hole in the wall 7 of the body 1. Located inside the sleeve 3 are resilient sealing elements 10, the diameter of the internal cylindrical surface of a particular resilient sealing element 10 corresponding to the diameter of the conductor 11 passing through it.

The sealed inlet for the bunched conductors is inserted into a hole following the shape of the body 1 in the wall of the building to be sealed, (not shown in the drawing) and is hermetically secured in said hole.

The sealed inlet for the bunched conductors is installed as follows.

The body 1 is hermetically built into a hole in the wall 12; then the resilient sleeve is inserted into the body and the sleeve flange 4 is hermetically fastened to the flange 2 of the body 1 by means of the frame 5 and bolts 6.

Resilient sealing elements 10 with the bunched conductors 11 are then placed into the resilient sleeve 3, the sleeve 3 is pressed by the retainer 9 and the hold-down strap 8 against the resilient sealing elements 10 and the latter resilient sealing elements clamp the conductors 11 located therein for the required degree of sealing.

Thus, the bunch of conductors 11 is compressed and the gap thus formed is sealed simultaneously, in one operation.

The present invention allows the sealed inlet to be installed by a single operator.

What is claimed is:

1. A sealed inlet for bunched conductors comprising:
   a body having a wall with a hole, and a flange formed on one end of said body;
   a resilient sleeve positioned within said body and following the shape of said body, a flange being formed on one end of said resilient sleeve and being in contact with said flange of said body;
   means for pressing said flange of said resilient sleeve against said flange of said body;

a hold-down strap installed on a wall of said resilient sleeve between said wall of said body and said resilient sleeve;

retainer means extending through said hole in said wall of said body and bearing against said hold-down strap;

resilient sealing elements positioned inside said resilient sleeve; and bunched conductors, each conductor being positioned within a respective resilient sealing element and having a diameter corresponding to an inner diameter of said respective sealing element;

wherein said bunched conductors and said resilient sealing elements are compressed into sealing engagement to provide said sealed inlet by the action of said retainer means, said hold-down strap, and said resilient sleeve.

2. A sealed inlet according to claim 2, wherein said means for pressing comprises: a frame in juxtaposition with said flange of said resilient sleeve; and bolts pressing said flange of said body, said flange of said resilient sleeve and said frame together.

3. A sealed inlet according to claim 2, wherein said retainer means comprises a bolt.

* * * * *